United States Patent [19]

Hamilton

[11] 3,708,842
[45] Jan. 9, 1973

[54] CUTTING TOOL WITH REPLACEABLE TEETH

[76] Inventor: Martin Norman Hamilton, R.D. No. 4, Meadville, Pa. 16335

[22] Filed: March 30, 1970

[21] Appl. No.: 23,615

[52] U.S. Cl. ................................................29/105 A
[51] Int. Cl. ................................................B26d 1/12
[58] Field of Search............................29/105, 105 A

[56] References Cited

UNITED STATES PATENTS

| 3,104,453 | 9/1963 | Greenleaf | 29/105 |
| 3,273,223 | 9/1966 | Wright | 29/105 |
| 3,408,722 | 11/1968 | Berry, Jr. | 29/105 |
| 3,481,015 | 12/1969 | Bogner | 29/105 |
| 2,224,173 | 12/1940 | Weddell | 29/105 |

FOREIGN PATENTS OR APPLICATIONS 1,921,532  4/1969  Germany..............................29/105

*Primary Examiner*—Harrison L. Hinson
*Attorney*—Charles L. Lovercheck

[57] ABSTRACT

The specification discloses a cutting tool having at least one tooth. The tooth is supported in a cutter support in a notch and has a threaded stud passing through a wedge key clamping the tooth in place. The tooth bottoms on a rib having a curved top.

3 Claims, 3 Drawing Figures

Inventor
MARTIN N. HAMILTON

By
Charles L. Lauderback Attorney

CUTTING TOOL WITH REPLACEABLE TEETH

OBJECTS OF THE INVENTION

It is an object of the invention to provide an improved cutting tool and support.

Another object of the invention is to provide a cutting tool and support in combination which is simple in construction, economical to manufacture, and simple and efficient to use.

Another object of the invention is to provide an improved cutting tool with replaceable teeth.

Another object is to provide an improved tooth clamp structure.

DETAILED DESCRIPTION OF THE DRAWINGS

Figure 1:
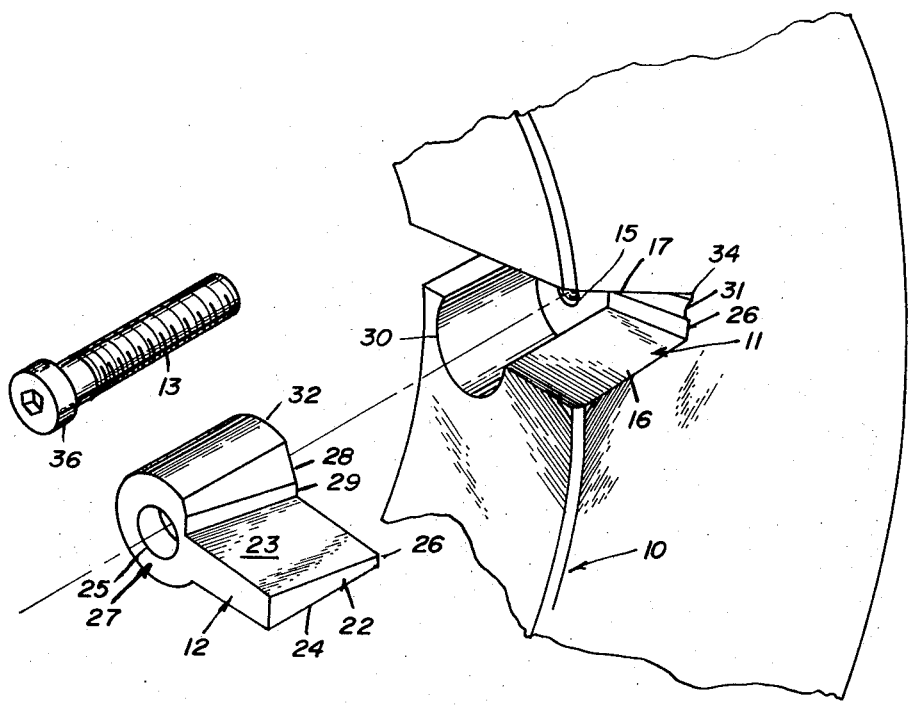
FIG. 1 is an exploded view of the device according to the invention.
Figure 2:
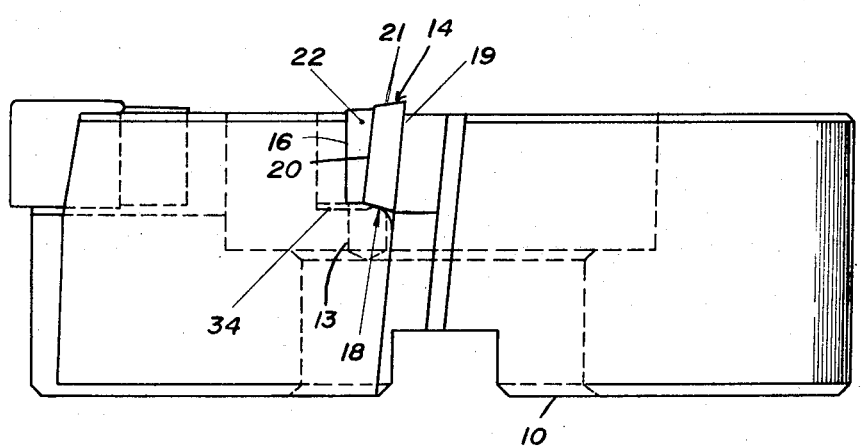
FIG. 2 is a side view of the cutter.
Figure 3:
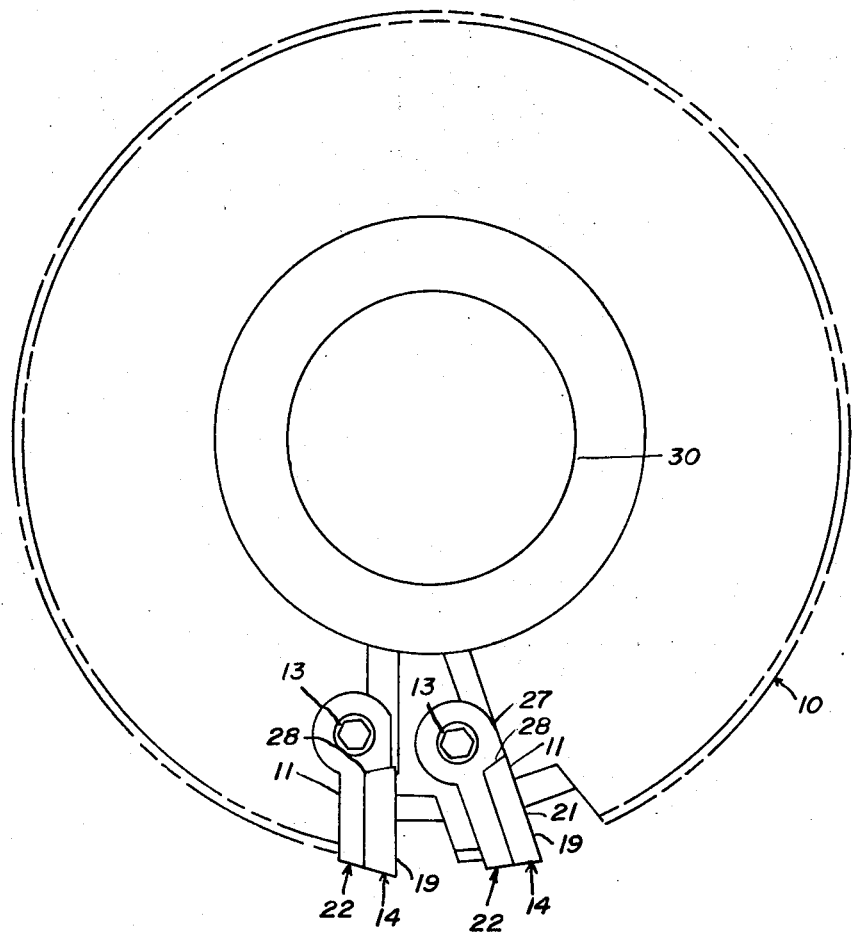
FIG. 3 is a top view of the cutter.

The cutter 10 is shown having notches 11 spaced around it. The cutter wheel can have one notch or one or more notches arranged in a circular configuration to make up a cutting wheel as shown. The notches are spaced the proper distance to provide the desired number of teeth in the holder 10. The teeth 14 are held in place by keys 12 which are clamped in the notches 11 by the stud 13. The teeth 14 are generally non-circular or rectangular in shape and may be made of hardened material so that the outer end can be ground to provide a cutting edge. The threaded hole 15 is provided at the bottom of the notch and the tooth 14 has a hole 25 which receives the stud 13. The stud 13 is threadably received in the threaded hole 15 in the support.

The notch has a flat side 16 parallel to center bore 30 and a side 17 and a bottom 26 that has a radially extending rib 31 across its top spaced above the bottom 26 of the notch.

The tooth has a bottom 18, sides 19 and 20, and a top 21.

The key 22 has an end 24 and a bottom 26, and a tapered side 23 which is inclined relative to the side 24, and side 24 being parallel to the axis of the hole 25, 30. A surface 28 and another surface 29 engage the end surfaces of tooth 14 and a cylindrical part in the support. The key 22 has sides 23 and 24 and a hole 25, a bottom 26 and a cylindrical part 27. Notch bottom 34 is spaced below the lower end of the key. Thus when the stud 13 is received in the hole 25, which is machined to receive the head 36 of the stud, the key can be clamped into place alongside the tooth side 19. Inclined lower edge 18 of tooth 14 will rest on the rib 31. The end 21 of tooth 14 may be ground at an angle to surface 16 to give a cutting clearance.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a cutting tool and holder for supporting said tool on a machine,
   said tool comprising a generally non-circular or rectangular member having an end adapted to be sharpened,
   said holder having a notch formed in it adapted to receive said tool having side surfaces that are parallel to each other,
   a wedge key member,
   an inclined surface on said holder adapted to engage a side of said key member,
   a threaded member extending through a hole in said key and engaging a threaded hole in said holder clamping said key to said holder,
   the bottom of said notch having a rib thereon with an arcuate top surface on which an end of said tool rests,
   said key having an inclined side engaging one side of said parallel sides of said tool,
   said holder has an axis and said notch has one side having a compound angle relationship to an axis of said holder,
   and said inclined surface comprises one side of said notch,
   said notch having a compound angle relationship to said hole,
   said holder has a cylindrical bore communicating with said notch,
   and said key has a cylindrical part having an outside surface complimentary in shape to said cylindrical bore, and said bore is concentric to said cylindrical member,
   a flat surface is formed on a side of said cylindrical member,
   said flat surface being inclined to the axis of said cylindrical member at an angle approximately equal to the incline of said surface on said clamping member and an end of said tool engages said flat surface on said key.

2. The combination recited in claim 1 wherein a plurality of said teeth are disposed on said holder and said holder comprises a round member.

3. The combination recited in claim 2 wherein said teeth extend outwardly from an end of said holder.

* * * * *